Patented July 4, 1950

2,514,219

UNITED STATES PATENT OFFICE 2,514,219

1,3,6-THIADIAZEPINE-2-THIONES AND THEIR PRODUCTION

James A. Shotton, Cedar Rapids, Iowa, assignor to The Firestone Tire & Rubber Company, Akron, Ohio, a corporation of Ohio No Drawing. Application March 30, 1949, Serial No. 84,496

8 Claims. (Cl. 260—239.3)

This invention relates to the reaction of carbon disulfide and 1,3-substituted imidazolidines. The invention relates to the process of preparing these compounds and to the compounds themselves, which are useful as accelerators and curing agents for the treatment of rubbery materials and may be useful as fungicides, insecticides, etc.

The imidazolidines are obtained by reacting an ethylenediamine with an aldehyde. Formaldehyde produces a product unsubstituted in the 2 position, and substitutions in the 2 position are obtained by using other aldehydes such as acetaldehyde, propionaldehyde, benzaldehyde, etc. When reacted with carbon disulfide, the 2-substituted imidazolidines under the conditions employed gave entirely different products from those obtained from the imidazolidines which are not substituted in the 2 position. They react with carbon disulfide to produce compounds which are believed to be cyclic and probably are 3,6-disubstituted hexahydro-1,3,6-thiadiazepine-2-thiones. The 4 and 5 positions may be substituted, although the preferred compounds of this invention are unsubstituted in the 4 or 5 position.

The following equations indicate the probable course of the reaction using formaldehyde:

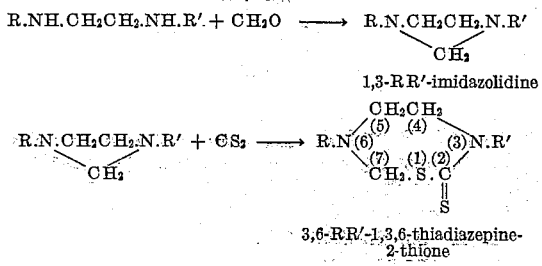

The reaction products are preferably produced from 1,3-disubstituted imidazolidines and carbon disulfide by refluxing in a mutual solvent, such as, for example, ether or alcohol. Molecular proportions of the reactants enter into the reaction, and, generally, substantially equal molecular proportions of the reactants will be employed, using such excess of one or the other as is required to increase the yield.

N,N'-disubstituted ethylenediamines are obtained by reacting ethylene dichloride with the appropriate amine in a bomb. The amine may contain one or more substituents of one to twenty carbon atoms of the class consisting of saturated aliphatic, unsaturated aliphatic, straight-chain aliphatic, branched-chain aliphatic, cycloaliphatic, cyclo-substituted aliphatic, terpenyl, heterocyclic, and hydrocarbon-substituted heterocyclic substituents. The 1,3-disubstituted imidazolidines were prepared by slowly adding formaldehyde (as 35 to 40 per cent Formalin) in 10 per cent molar excess to the appropriate ethylenediamine. A highly exothermic reaction ensued and the addition of Formalin was regulated to keep the temperature below 50° C. When diethyl, diisopropyl and dicyclohexylethylene diamines were used, formation of the diamine hydrate on addition of Formalin caused solidification of the reaction mixture. On further addition of Formalin the mass liquified. At the completion of most of the reactions two liquid phases (water and imidazolidine) were present. Separation of the diethyl, diallyl and diisopropyl imidazolidine was induced by salting. Solid products were recrystallized from benzene, and liquids were purified by distillation. The N,N'-disubstituted ethylene diamines may be symmetrical or unsymmetrical and may include as substituents methyl, ethyl, propyl, n-butyl, sec.-butyl, tert.-butyl, any amyl, hexyl, heptyl, octyl, dodecyl, octadecyl, etc., cyclopentyl, cyclohexyl, methylcyclohexyl, benzyl, furfuryl, thienyl, pyridinyl, octenyl, hexenyl, terpenyl, bornyl, etc., etc.

EXAMPLE I

*1,3-dicyclohexylimidazolidine and its carbon disulfide reaction product*

1,3-dicyclohexylimidazolidine was prepared by adding slightly more than one-half mole of 37 per cent formaldehyde solution to one-half mole of N,N'-dicyclohexylethylenediamine and allowing the mixture to stand over night. The mixture was treated with potassium carbonate (anhydrous), after which the top layer was separated and distilled under reduced pressure. The main portion of the imidazolidine came over at 173–175° C. at 8 to 10 mm.

One-half mole of the imidazolidine was reacted with one-half mole of carbon disulfide by dissolving both reactants in 100 cc. of ether, heating to reflux temperature, and then allowing to stand over night. The product came down as a yellow solid. The crude product was crystallized once from acetone. In a melting point tube this reaction product decomposed at 100–102° C.

The carbon disulfide reaction carried out by refluxing in alcohol was not successful because the reaction product decomposed at the refluxing temperature.

EXAMPLE II

*1,3-diisopropylimidazolidine and its carbon disulfide reaction product*

A slight excess over molecular proportions of N,N'-diisopropylethylenediamine and 37 per cent formaldehyde solution were mixed. The mixture was allowed to stand over night. The mixture was then saturated with potassium carbonate, and the upper layer then separated and distilled at atmospheric pressure. The boiling point of the resulting 1,3-diisopropylimidazolidine was 183–185° C.

The 1,3-diisopropylimidazolidine was reacted with an excess of carbon disulfide in ether solution by allowing the mixture to stand over night at room temperature. The next morning a yellow solid product had formed. In a melting point tube, this product decomposed at 99 to 100° C.

Various of the carbon disulfide reaction products were similarly prepared. On analysis for sulfur (semi-micro Parr bomb) and nitrogen (micro Friedrich-Kjeldahl) it was found that the carbon disulfide and imidazolidines had reacted in molecular proportions. Information on the reactions and reaction products is tabulated below, the products being identified briefly by giving their N,N'-substituents.

*Physical properties*

| Accelerator | N,N'-Dicyclohexyl | N,N'-Diisopropyl |
|---|---|---|
| Parts per 100 | 1.5 | 1.4 |
| Modulus at 300%: | | |
| 20 min | 150 | 125 |
| 40 min | 275 | 175 |
| 80 min | 600 | 300 |
| 160 min | 900 | 600 |
| Modulus at 400%: | | |
| 20 min | 200 | 175 |
| 40 min | 425 | 225 |
| 80 min | 975 | 400 |
| 160 min | 1,500 | 900 |
| Tensile Strength: | | |
| 20 min | 475 | 225 |
| 40 min | 925 | 350 |
| 80 min | 1,875 | 700 |
| 160 min | 2,225 | 1,625 |
| Elongation: | | |
| 20 min | 820 | 830 |
| 40 min | 720 | 760 |
| 80 min | 620 | 660 |
| 160 min | 540 | 600 |

*Carbon disulfide reaction products*

| Substituents | Reaction Solvent | Percent Yield | M. P., °C. (Corrected) | Calculated Percent N | Calculated Percent S | Found Percent N | Found Percent S |
|---|---|---|---|---|---|---|---|
| N,N'-Diethyl | Ether | 86 | 68.4–69.4 | 13.72 | 31.40 | 13.82 | 31.52 |
| N,N'-Diisopropyl | Alcohol | 82 | 103.0 | 12.07 | 27.58 | 12.05 | 27.20 |
| N,N'-Di-n-butyl | Ether | 61 | 61.4–61.8 | 10.78 | 24.59 | 10.75 | 24.55 |
| N,N'-Dicyclohexyl | Alcohol | 97 | 98–99.4 | 8.97 | 20.51 | 8.95 | 20.20 |

The carbon disulfide reaction products of this invention are accelerators of the sulfur-vulcanization of any rubber stock whether it comprise natural rubber, butyl rubber, copolymer of a conjugated-diene monomer and vinyl monomer, etc. The conjugated-diene monomers include, for example, 1,3-butadiene, isoprene, 2-cyanobutadiene-1,3, 2-chlorobutadiene-1,3, cyclopentadiene, piperylene, dimethylbutadiene-1,3, 2-methylpentadiene-1,3, 2-vinyl-5-ethylpyridine, 2-ethyl-5-vinylpyridine, etc. The vinyl monomers include, for example, styrene, alpha-methylstyrene, nuclear substituted styrenes, monochlorostyrene dichlorostyrene, vinylnaphthalene, vinylbiphenyl, vinylcarbazole, acrylonitrile, methacrylonitrile, ethacrylonitrile, chloro-acrylonitrile, acrylic acid esters containing one to five or more carbon atoms in the ester group, acrylamide, etc. As illustrative of the use of these compounds as accelerators, there is included herein results of tests in a cured GR-S (copolymer of 1,3-butadiene and styrene) tread stock compounded according to the following formula:

| | Parts by weight |
|---|---|
| GR-S copolymer | 100.00 |
| Carbon black | 45.00 |
| Coal tar softener | 5.00 |
| Zinc oxide | 5.00 |
| Sulfur | 2.00 |

The accelerators used were the carbon disulfide reaction products prepared according to Examples 1 and 2. The amount of accelerator used is indicated in the following table of properties. In the table the accelerators are identified simply by their substituents. All stocks were cured 20, 40, 80 and 160 minutes at 280° F., and listed under each of the properties are the values obtained on stocks cured for each of these several periods. The modulus and tensile strength are recorded in pounds per square inch, and the elongation in percentages.

The increase in modulus and tensile strength produced by prolongation of the cure shows an improvement in properties which would not be obtained under the same conditions of cure in the absence of an accelerator.

What I claim is:

1. A 3,6 - disubstituted 1,3,6 - thiadiazepine-2-thione having the formula

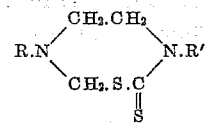

in which R and R' are from the group of radicals consisting of alkyl, alkenyl, cycloalkyl and benzyl, each of which contains no more than twenty carbon atoms.

2. A 3,6-dialkyl 1,3,6-thiadiazepine-2-thione having the formula

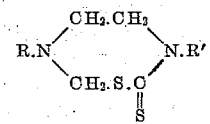

in which R and R' are alkyl groups each containing one to twenty carbon atoms.

3. 3,6, - dicyclohexyl - 1,3,6 - thiadiazepine - 2-thione.

4. 3,6-diisopropyl-1,3,6-thiadiazepine-2-thione.

5. The process of producing an imidazolidine derivative which comprises reacting equimolecular weights of carbon disulfide and a 1,3-disubstituted imidazolidine, each substituent containing one to twenty carbon atoms and being of the class of radicals consisting of alkyl, alkenyl, cycloalkyl and benzyl, each containing no more than twenty carbon atoms, and reacting within a temperature range which includes room temperature and the refluxing temperature of an ether solution thereof so as to prevent decomposition.

6. The process of reacting carbon disulfide and a 1,3-dialkyl imidazolidine which comprises refluxing equimolecular weights of the two in an inert solvent in which they are soluble, within a temperature range which includes room temperature and the refluxing temperature of an ether solution thereof so as to prevent decomposition, each alkyl substituent containing one to twenty carbon atoms.

7. The process of reacting carbon disulfide and 1,3-dicyclohexylimidazolidine which comprises refluxing equimolecular weights of the two in a solvent in which they are soluble, within a temperature range which includes room temperature and the refluxing temperature of an ether solution thereof so as to prevent decomposition.

8. The process of reacting carbon disulfide and 1,3-diisopropylimidazolidine which comprises refluxing equimolecular weights of the two in a solvent in which they are soluble, within a temperature range which includes room temperature and the refluxing temperature of an ether solution thereof so as to prevent decomposition.

JAMES A. SHOTTON.

REFERENCES CITED

The following references are of record in the file of this patent:

UNITED STATES PATENTS

| Number | Name | Date |
| --- | --- | --- |
| 2,170,059 | Mathes | Aug. 22, 1939 |
| 2,236,389 | Williams | Mar. 25, 1941 |